United States Patent Office 3,418,901
Patented Dec. 31, 1968

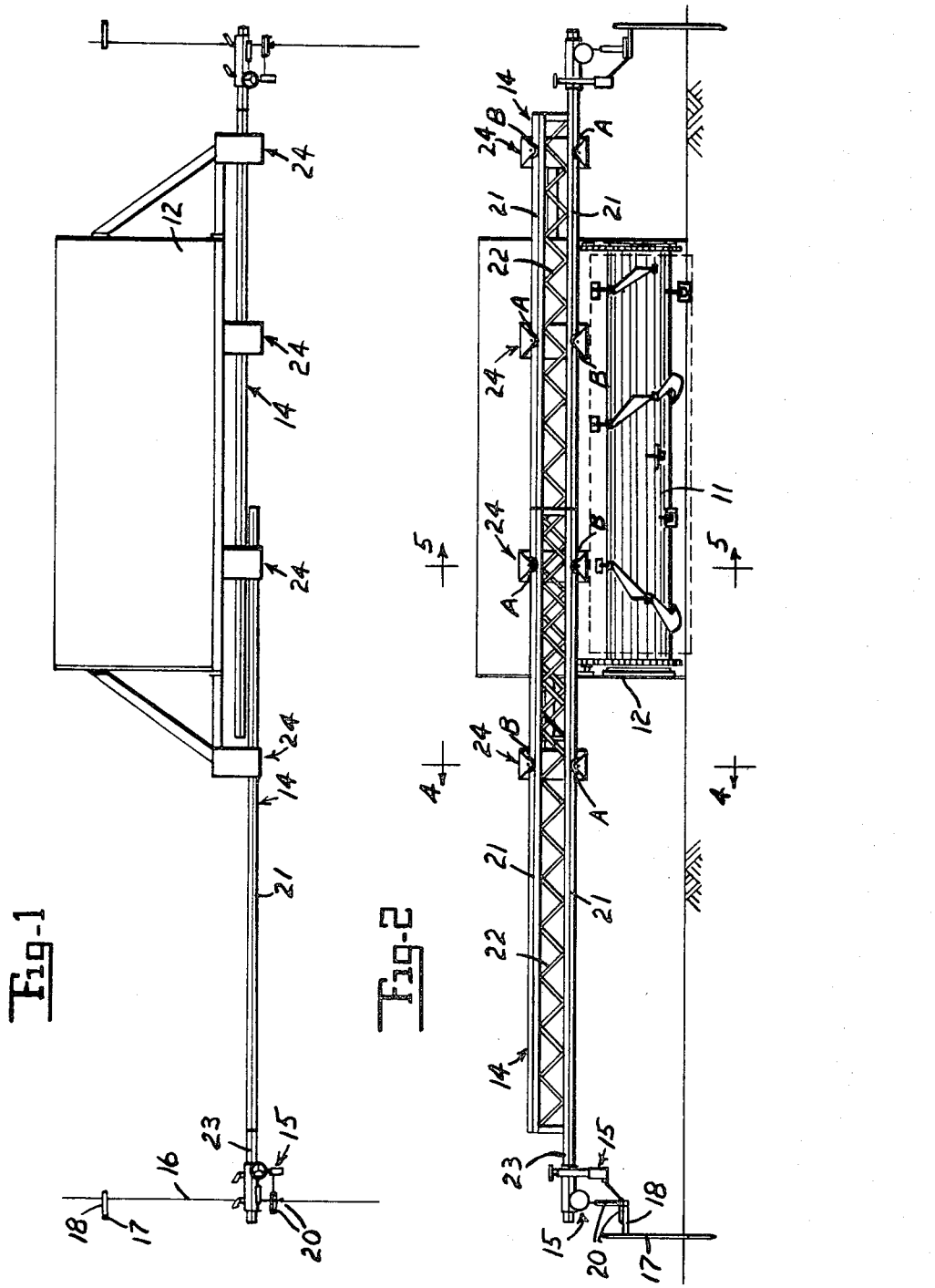

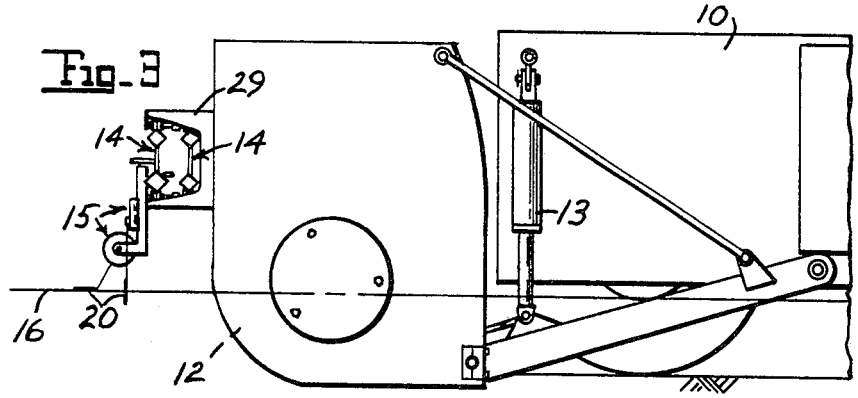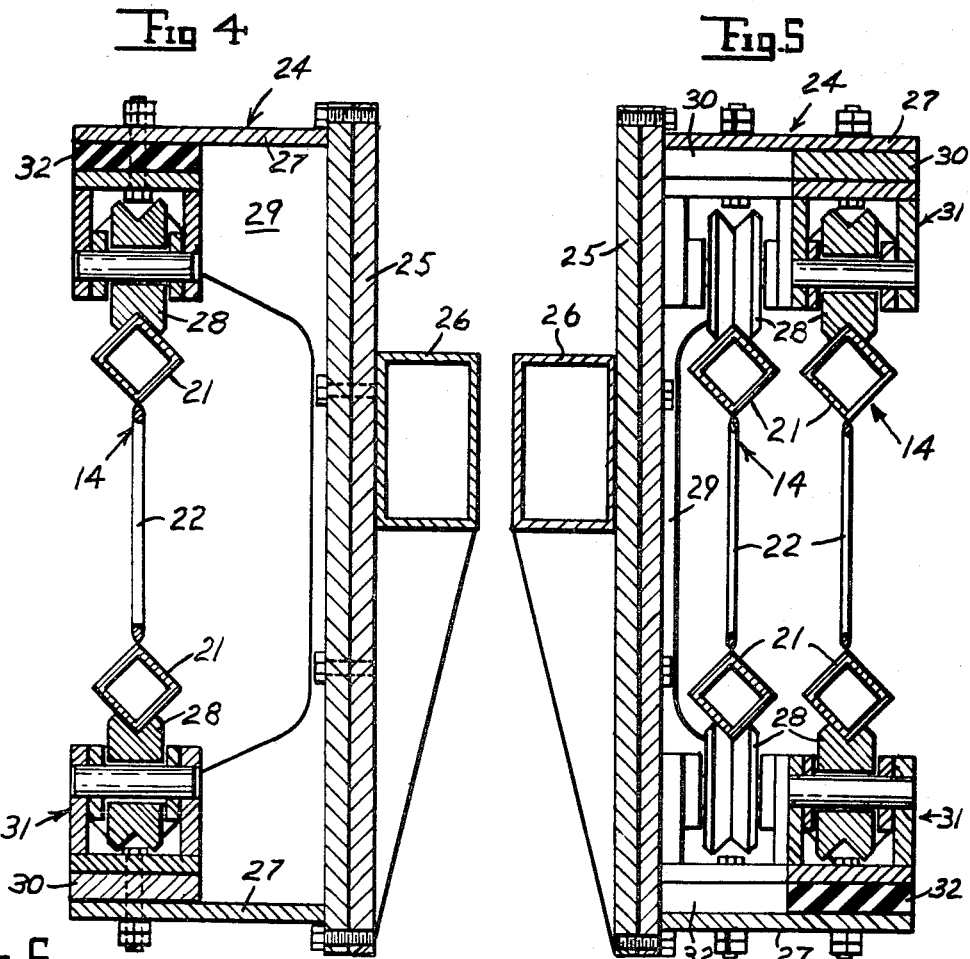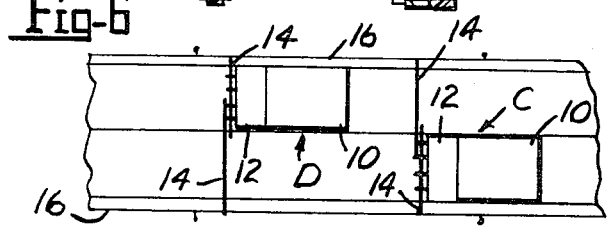

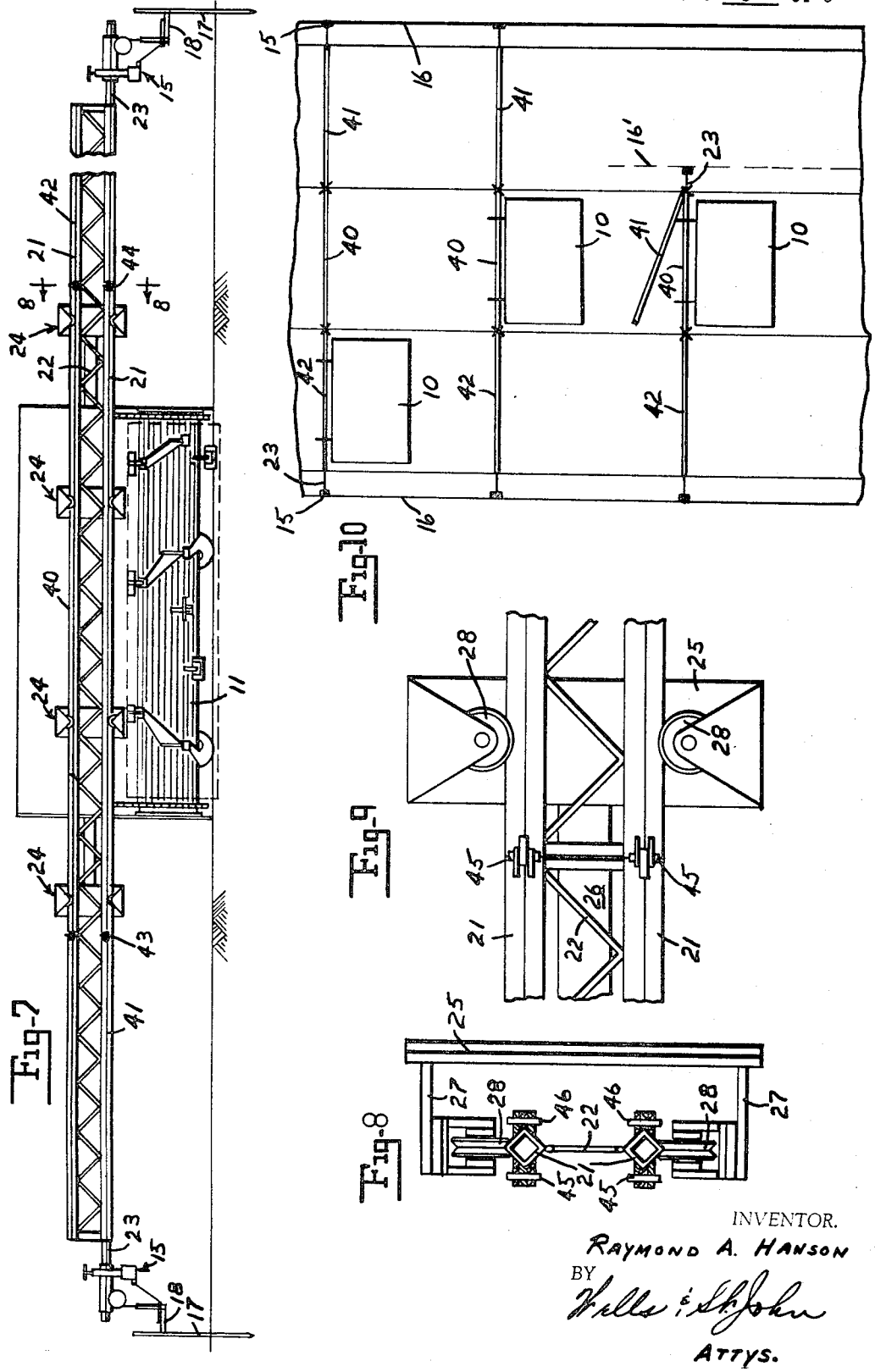

3,418,901
CONTROL FOR ROADWAY SURFACE
PREPARATION APPARATUS
Raymond A. Hanson, R. A. Hanson Company,
Palouse, Wash. 99161
Filed Aug. 8, 1967, Ser. No. 659,224
3 Claims. (Cl. 94—39)

ABSTRACT OF THE DISCLOSURE

An apparatus for surface preparation along a multi-lane roadway using automatic line controls wherein the controlling line or lines are located along the respective sides of the roadway and wherein a single lane machine is utilized in successive passes for surface preparation on more than one lane. To provide positive continuity in grade and direction between the several lanes prepared in this fashion, there is provided a support arm for grade and direction monitoring devices which can be extended outwardly from the apparatus in a straight line to serve as a properly positioned extenion of the apparatus. By such extension, discontinuity between the adjacent lane prepared by the apparatus is eliminated.

BACKGROUND OF THE INVENTION

The present disclosure is concerned generally with surface preparation apparatus for multi-lane roadways. The surface preparation might be in the form of soil grading, sub-base laying and grading, paving, or any other surfacing operations desirable in a particular project. These operations can be monitored automatically for direction and grade control by sensing devices controlled from a line along at least one side of the roadway, and preferably by two lines at opposite sides of the roadway. Where a single lane apparatus is used in the preparation of multiple adjacent lanes, difficulty has been encountered in insuring continuity of grade and directional controls between the several lanes. This is most difficult when repositioning of the lines is necessary for each pass of the machinery.

The present apparatus provides for the use of lines along the side of the roadway without such repositioning, and insures the consistent positional relationship between the surface apparatus and the lines, regardless of which lane is being prepared at a given time. By use of this control arrangement, surface quality can be obtained comparable to that obtained by use of a single machine that extends across the full width of the roadway.

The general type of control involved herein is illustrated in my U.S. Patent No. 3,247,771. The particular features of the controls shown in that patent disclosure are not significant, but it adequately shows an example of a control system using a ground supported framework, surfacing means movably mounted on the framework, power means to move the surfacing means relative to the roadway, and sensing means to control the power means. The sensing means includes an element or finger that engages the line and slides along it as a reference. The particular type of power devices, sensing devices and surfacing apparatus used in a particular application is immaterial to an understanding of this disclosure. The present apparatus makes possible the application of any such single lane arrangement to multi-lane surface preparation procedures.

It is one object of this invention to provide an apparatus for utilizing automatic directional control devices on surface preparation machinery that permits the utilization of single lane machinery with the same effectiveness as is accomplished with full width machinery.

Another object of the invention is to eliminate the possibility of misalignment in repositioning directional monitoring devices relative to the apparatus being monitored.

SUMMARY OF THE INVENTION

The invention is concerned with the mounting of the sensing devices that engage the fixed reference line at one or both sides of a multi-lane roadway. This support apparatus includes an elongated arm that is adjustably positioned on the machinery element being monitored in such a fashion as to selectively span an adjacent lane along the roadway. Extension of the arm to one side of the apparatus is permitted in a common plane. In the case of grade control usage, this plane is parallel to the surface produced by the surface preparation apparatus. Specifically, the arm is mounted for straight line movement in a transverse direction so as to be extended with the grade monitoring means at the same relative elevational height with respect to the prepared surface produced by the apparatus. A specific roller support described herein facilitates positioning of the arm and automatically insures against accidental movement thereof during use.

DESCRIPTION OF THE DRAWINGS

FIG. 1 is a top view showing the mounting of the movable arms on a surfacing machine;
FIG. 2 is a front view of the apparatus shown in FIG. 1;
FIG. 3 is a side view of the apparatus shown in FIG. 1;
FIG. 4 is an enlarged sectional view taken through the arm support along line 4—4 in FIG. 2;
FIG. 5 is an enlarged sectional view taken through the arm support along line 5—5 in FIG. 2;
FIG. 6 is a schematic view showing the intended use of the apparatus;
FIG. 7 is a front view of the apparatus similar to FIG. 2 showing a modified arm structure;
FIG. 8 is an enlarged sectional view taken along line 8—8 in FIG. 7 showing the arm and support bracket;
FIG. 9 is an enlarged front view of the structure shown in FIG. 8;
FIG. 10 is a schematic view showing the intended use of the modified structure.

PREFERRED EMBODIMENT OF THE INVENTION

Surface preparation devices and machinery for roadways take many forms. They include machines for cutting soil to a specified grade, for placement and grading of sub-base materials, and for paving the roadway with one or more layers of finished material. In each instance, it is essential that the characteristics of the surface produced by such machinery be controlled as to grade, direction and transverse slope. In the type of apparatus with which this disclosure is concerned, the controls are operated automatically by reference of the machine to a fixed line along at least one and preferably both sides of the roadway. The lines are located accurately by surveying techniques. Automatic sensing and directional controls on the apparatus then produce a surface parallel to the line or lines. Such controls include automatic controls for steering or transverse positioning of the machine and also for grade control longitudinally and slope control transversely of the machine.

Many such machines are designed, for reasons of economy and maneuverability, to operate across only one lane of a multi-lane roadway. As used herein, the designation "lane" refers to a fractional distance across the total width of a roadway, and is not intended to be restricted to any given distance or fractional relationship with respect to the total width of the roadway. The use of such devices is complicated in the case of multi-lane roadways by the fact that the automatically controlled grades of the several passes required to complete surfacing operations across the width of the roadway to be interrelated to provide a continuous surface having common elevation, cross leveling and transverse directional characteristics. This is particularly difficult if the successive usage of the machine requires successive placement of reference lines across the roadway.

The details of the control elements themselves are not necessary for an understanding of this invention. One example of such control elements and power devices for positioning surface preparation devices is shown in detail in my prior U.S. Patent No. 3,247,771, wherein pneumatic control elements engage the line and operate hydraulic controls on the machine framework for positioning purposes. Other sensing and monitoring devices and power arrangements can be substituted.

Illustrative of the type of machinery which this improvement can be utilized is a trimming and excavating apparatus shown generally in FIGURES 1, 2 and 3. These drawings illustrate the forward position of a trimming and grading apparatus shown in my copending application, U.S. Ser. No. 621,271, filed Mar. 10, 1967. The structure is carried by a rear ground supported framework 10 (FIG. 3), and includes a trimming and excavating auger 11 rotatably supported in a forward auger frame 12. The frame 12 is independently adjustable at each side by cylinders 13. The framework 10 can be steered by driving independent powered wheels or tracks, by pivoting articulated frame sections or by turning front or rear wheels.

Mounted on the auger frame 12 and extending outwardly to opposite sides thereof are two arms 14. These arms are used to carry the position sensing devices 15 that engage a reference line 16 mounted in a fixed position relative to the ground by supporting posts 17 and brackets 18. The position sensing devices 15 each include a finger 20 that rests against the string, commonly against its underside or inside surface. By providing a line 16 at each side of the multi-lane roadway, the position monitoring devices 15 can accurately respond to deviations in the desired directional path of the auger 11 in any plane, whether vertical, transverse, or angular. Deviations from this path result in correction by the cylinders 13 or by the steering apparatus for framework 10, and continue until the pressure of fingers 20 on the line 15 is again neutralized.

As shown in FIGURES 1 through 3, each arm 14 is fabricated in the form of a structural girder, including parallel upper and lower lengths of square tubing 21 and a connecting angularly bent rod 22. A rigid extension 23 is provided at the outer end of the lower length of tubing 21 on each arm 14. The sensing devices are adjustably mounted along the extension 23.

Each length of tubing 21 provided in the arms 14 is set on edge so as to provide upwardly and downwardly facing angular outer surfaces. These surfaces are engaged and guided by grooved rollers mounted within roller support assemblies generally designated by the numeral 24. The roller mounting arrangements in the assemblies 24 are substantially identical at each side of the unit, except that the rollers for one arm are mounted forward of the rollers for the other so that the two arms can be moved transversely past each other.

Each roller assembly 24 includes opposed upper and lower rollers formed with peripheral grooves complementary to the outer surfaces of the tubes 21 and preferably made of steel. The steel rollers frictionally engage the respective lengths of tubing and accurately locate the tubing relative to the roller support assemblies 24 and to the auger frame 12 on which the assemblies 24 are fixedly carried. As shown, each roller support assembly 24 includes a mounting plate 25 fixed to a transverse length of tubing 26 which in turn is bolted or otherwise secured to the front surface of auger frame 12. A pair of transverse side plates 29 are located at each of the assemblies 24. Upper and lower horizontal mounting plates 27 are provided to support the roller assemblies.

The rollers 28 are mounted on blocks of metal or rubber. To provide positive control of the position of each arm 14, the outside lower roller 28 and the inside upper roller 28 for each arm 14 are fixed in position by means of metal mounting blocks 30 that support the roller bearing assemblies 31. The two remaining rollers for a particular arm are supported by yieldable rubber blocks 32 which mount the roller bearing assemblies 31. The pattern of this arrangement can be best seen in FIG. 2 wherein the rollers 28 that are fixed by the metal blocks are designated by the letter A and the rollers 28 mounted by the yieldable rubber blocks are designated by the letter B. The fixed rollers 28 prevent yielding deflection of the extended arm 14 supported thereby, while the yielding rollers forcibly grip the arms 14 and hold them in proper position for frictional engagement against the fixed guiding rollers. This arrangement also provides adequate frictional engagement of the arms 14 so that no additional locking mechanism is necessary in order to prevent accidental movement of arms 14 during use. The frictional engagement of the rollers 28 has been found to be adequate for this purpose.

The arms 14 are shown in FIGS. 1 and 2 with one arm fully extended and one fully retracted. The sensing devices on the extensions 23 are shown as they would be located to contact the line 16 at each side of a two lane roadway the apparatus being adapted for surfacing of a single lane at one pass. While the arms 14 do not extend transversely one full machine width, the excess width required to span a full lane is provided by transversely repositioning the sensing devices along the extensions 23. This permits the arms 14 to be supported generally within the width of the machine. Slight lateral expansion of this width being provided along the length of tubing 26 as can be seen in FIG. 1.

In operation, the apparatus will be used for finishing operations along one lane of a dual lane roadway by positioning arms 14 as shown in FIGURES 1 and 2. This is schematically illustrated in FIGURE 6 by the apparatus as shown at C. Then, when that pass is completed, the machine can be returned to its original position and the location of the arms 14 is reversed by moving them transversely relative to the auger frame 12. The machine can then be used to perform surfacing operations on the adjacent lane in the manner shown at D in FIGURE 6. In each case, since the arms 14 are rigid and accurately located in a single plane that is parallel to the surface created by the auger 11, the final surface will be finished along a common plane in the same manner as if it had been worked upon by a full width machine. During the two passes required, the sensing devices 15 are not repositioned relative to the auger frame 12 except in a transverse direction. Their relative elevations with respect to frame 12 and the lines 16 are unchanged so as to operate the machine in a common plane during each pass.

These supports can also be used in an operation where the machine is controlled by a single line along only one side of a dual lane roadway. Where single line operation is used, a level-operated transverse slope monitor is required. Examples of such a leveling arrangement are shown in my prior U.S. Patent No. 3,118,088.

A slightly modified form of the apparatus is illustrated in FIGS. 7 through 9. Its operational characteristics are shown schematically in FIG. 10. Identical reference numerals are used in FIGS. 7 through 9 to indicate elements described above.

In this form of the apparatus, only a single arm assembly is utilized. This arm assembly includes a central portion 40, and two side portions 41 and 42 respectively hinged to the central portion 40 by pivot connections designated by the numerals 43 and 44. Each pivot connection is located toward the front side of the arm assembly and below the lines of contact of the rollers 28. Each pivot connection includes a pivot pin 45 at the front of the arm assembly and a releasable locking pin 46 at the rear side. The locking pin 46 is removed to permit the respective arm portions to pivot about the pins 45. When the pins 46 are inserted after realignment of the adjacent arm portions, the pivotable arm portions form a rigid elongated arm structure.

With this modification, one can readily adapt the basic concept of this disclosure to many variations in lane operation. As shown in FIG. 10, the apparatus can be used for three lane surfacing operations. At the top of FIG. 10, the left hand arm portion 42 is positioned immediately forward of the framework 10. The left hand line 16 is engaged by position monitoring devices 15 mounted on an extension 23 adjacent to framework 10. The remaining arm portions 41, 40 are locked to one another and extend across the two adjacent lanes to provide support for the monitoring devices 15 that engage the opposite line 16. At the center of FIG. 10, the framework 10 is now centered on the arm support in the manner shown in FIG. 7 to permit surfacing operations at the center lane. The right hand lane would be operated upon by repositioning the arm assembly opposite to that shown at the top of FIG. 10. At the lower portion of FIG. 10, the arm 41 is schematically shown in a folded position with the extension 23 now being mounted at the open end of the central arm portion 40. This is illustrated to show the configuration available for two lane surfacing with this single arm assembly, the extension 23 being used to bridge the gap to the string line designated by the numeral 16' and shown as a dashed line at the lower portion of FIG. 10.

The basic object of the present apparatus is to permit the single placement of reference lines at two sides of the multi-lane roadway and to readily position a surfacing apparatus relative to the sides in more than one of the lanes during successive passes. By the use of arms that are movable transversely and which are parallel to the surface produced by the surface preparation equipment, the relative elevation between the monitoring devices and the desired surface remains unchanged regardless of the lateral extension provided. The apparatus in effect then works to the same degree of accuracy as would an apparatus having twice its width and involving subsequent additional initial expenses and loss of maneuverability.

Modifications can be made in the specific structure shown. The control devices can be positioned at various locations relative to the apparatus being monitored. The details of the sensing devices and the manner in which the various frames are positioned relative to one another or to the supporting ground surfaces can obviously be modified. However, the basic concept herein is the straight line extension of the sensing devices transverse to the supporting frame to provide operation similar to that of a machine having greater width. The surfaces resulting from use of the present mounting arrangement are in line with one another and co-planar so that one lane forms a continuous extension of the other. This is particularly important and necessary in the preparation and paving of highways and airstrips. It is important in other applications where accurate surfacing is imperative.

Having thus described my invention, I claim:

1. In a surface preparation apparatus for a multi-lane roadway defined by a ground-supported line parallel to the roadway and positioned at one side thereof including:
    a ground-supported mobile framework;
    surfacing means movably mounted on said framework for selective positional adjustment relative thereto, the operational width of said surfacing means being the width of a single lane along said roadway;
    power means to selectively move said surfacing means relative to the roadway;
    and sensing means engageable with the lines to control operation of said power means including an element that engages said line as a reference;
    the improvement comprising:
    an elongated arm having upper and lower surfaces and having a length greater than the width of a single lane along said roadway, said arm being movably supported on said surfacing means for selective extension outward of the side thereof facing said line, said sensing means being mounted on said arm adjacent the outer end thereof;
    and support means operatively connected said surfacing means and said arm to guide said arm transversely and to selectively maintain said arm in a plurality of transverse positions for engagement of the line by said sensing means;
    a second identical elongated arm movably supported on said surfacing means for selective extension outward to the opposite side thereof and having sensing means mounted on said arm adjacent the outer end thereof for engagement with a second ground supported line;
    said support means being operatively connected between said surfacing means and said second arm to guide said second arm transverse and to selectively maintain it in a plurality of transverse positions for engagement of the second line by said sensing means, said support means guiding the arms for overlapping transverse movement relative to one another.

2. In a surface preparation apparatus for a multi-lane roadway defined by a ground-supported line parallel to the roadway and positioned at one side thereof including:
    a ground-supported mobile framework;
    surfacing means movably mounted on said framework for selective positional adjustment relative thereto, the operational width of said surfacing means being the width of a single lane along said roadway;
    power means to selectively move said surfacing means relative to the roadway;
    and sensing menas engageable with the lines to control operation of said power means including an element that engages said line as a reference;
    the improvement comprising:
    an elongated arm having upper and lower surfaces and having a length greater than the width of a single lane along said roadway, said arm being movably supported on said surfacing means for selective extension outward of the side thereof facing said line, said sensing means being mounted on said arm adjacent the outer end thereof;
    and support means operatively connected said surfacing means and said arm to guide said arm transversely and to selectively maintain said arm in a plurality of transverse positions for engagement of the line by said sensing means, said support means comprising transversely spaced rollers respectively engaged with the upper and lower surfaces of said arm.

3. An apparatus as set out in claim 2 wherein said rollers are located in two transversely spaced vertical pairs and wherein the outward pair of rollers has a lower roller fixed in position relative to said surfacing means and an opposed upper roller yieldably mounted on said surfacing means and urged toward the lower roller, the inward pair of rollers being oppositely mounted, the fixed roller being above the yieldable roller.

References Cited

UNITED STATES PATENTS

| | | | |
|---|---|---|---|
| 2,922,345 | 1/1960 | Mentes | 94—46 |
| 3,247,771 | 4/1966 | Hanson | 94—46 |
| 3,264,958 | 8/1966 | Babb | 94—46 |
| 3,323,427 | 6/1967 | Schrimper | 94—46 |

NILE C. BYERS, JR., *Primary Examiner.*

U.S. Cl. X.R.

94—46